United States Patent
Mutoh et al.

(10) Patent No.: US 9,209,926 B2
(45) Date of Patent: Dec. 8, 2015

(54) COMMUNICATION SYSTEM AND METHOD THEREFOR

(71) Applicant: FUJITSU LIMITED, Kawasaki-shi, Kanagawa (JP)

(72) Inventors: Ryoichi Mutoh, Kawasaki (JP); Hiroyuki Kitajima, Oyama (JP)

(73) Assignee: FUJITSU LIMITED, Kawasaki (JP)

( * ) Notice: Subject to any disclaimer, the term of this patent is extended or adjusted under 35 U.S.C. 154(b) by 397 days.

(21) Appl. No.: 13/875,978

(22) Filed: May 2, 2013

(65) Prior Publication Data
US 2013/0243428 A1 Sep. 19, 2013

Related U.S. Application Data

(63) Continuation of application No. PCT/JP2010/072462, filed on Dec. 14, 2010.

(51) Int. Cl.
| | |
|---|---|
| *H04J 14/00* | (2006.01) |
| *H04J 14/02* | (2006.01) |
| *H04J 3/16* | (2006.01) |

(52) U.S. Cl.
CPC .......... *H04J 14/0287* (2013.01); *H04J 3/1652* (2013.01); *H04J 2203/0069* (2013.01); *H04J 2203/0089* (2013.01)

(58) Field of Classification Search
CPC .............. H04J 14/0287; H04J 14/0227; H04J 14/0272; H04J 14/0273; H04J 14/0267; H04J 14/0268; H04B 10/032
USPC .............. 398/45, 79, 48, 46, 49, 3, 5, 51, 54, 398/182, 183, 202, 208, 158, 159, 7, 33, 398/43; 370/216, 222, 225, 228, 229
See application file for complete search history.

(56) References Cited

U.S. PATENT DOCUMENTS

| | | | | |
|---|---|---|---|---|
| 5,739,934 | A | * 4/1998 | Nomura et al. | .................. 398/79 |
| 5,898,743 | A | 4/1999 | Shoji et al. | |
| 6,542,563 | B1 | 4/2003 | Shoji | |
| 7,136,593 | B1 | * 11/2006 | Yano | .............................. 398/158 |

FOREIGN PATENT DOCUMENTS

| | | |
|---|---|---|
| CA | 2 192 516 C | 9/1997 |
| CA | 2 256 880 A1 | 11/1999 |
| JP | 03-201837 A | 9/1991 |
| JP | 09-247114 A | 9/1997 |
| JP | 11-340961 A | 12/1999 |
| JP | 2004-266480 A | 9/2004 |
| JP | 2008-113395 A | 5/2008 |
| JP | 2010-114691 A | 5/2010 |

* cited by examiner

*Primary Examiner* — Hanh Phan
(74) *Attorney, Agent, or Firm* — Arent Fox LLP

(57) ABSTRACT

A frame transmitting apparatus includes a transmitting unit which transmits, when a change is made to a value in a predetermined field of a frame, the frame including the predetermined field with the changed value a predetermined number of times in succession. A frame receiving apparatus includes a receiving unit which receives the frame and an acceptance processing unit which recognizes the value in the predetermined field of the received frame and conducts acceptance processing. The acceptance processing unit compares, when the value is different from a currently accepted value, the value with an expected value; accepts the value when the value matches the expected value; and accepts, when the value does not match the expected value, the value after receiving the same value the predetermined number of times in succession.

6 Claims, 17 Drawing Sheets

OTU FRAME

| Bits 1 AND 2 | Bits 3 TO 8 |
|---|---|
| ODTU Type | Tributary Port # |

FIG. 7

| OPU Type | PT | ODTU Type | Tributary Port Numbers |
|---|---|---|---|
| OPU1 (1.25G TS) | 20 | 11: ODTU01 (FIXED VALUE) | PSI[2]: 00 0000 (1) PSI[3]: 00 0001 (2) (FIXED VALUE) |
| OPU2 (2.5G TS) | 20 | 00: ODTU12 (FIXED VALUE) | PSI[2]: 00 0000 (1) PSI[3]: 00 0001 (2) PSI[4]: 00 0010 (3) PSI[5]: 00 0011 (4) (FIXED VALUE) |
| OPU3 (2.5G TS) | 20 | 00: ODTU13 01: ODTU23 10: reserved 11: reserved | 00 0000 (1) ~ 00 1111 (16) |
| OPU2 (1.25G TS) | 21 | 00: ODTU12 01: reserved 10: ODTU2.ts 11: TS UNALLOCATED | 00 0000 (1) ~ 00 0111 (8) |
| OPU3 (1.25G TS) | 21 | 00: ODTU13 01: ODTU23 10: ODTU3.ts 11: TS UNALLOCATED | 00 0000 (1) ~ 01 1111 (32) |

MSI ENCODING

FIG. 8

|   | PT | 21 | |
|---|---|---|---|
| 0 | RES | | |
| 1 | | | |
| 2 | TS1 | 10 | 000000 |
| 3 | TS2 | 11 | NA |
| 4 | TS3 | 00 | 000001 |
| 5 | TS4 | 00 | 000001 |
| 6 | MSI — TS5 | 11 | NA |
| 7 | TS6 | 11 | NA |
| 8 | TS7 | 11 | NA |
| 9 | TS8 | 11 | NA |
| 10 | RES | | |
| 255 | | | |

(Row labels on left: 0, 1, 2, 3, 4, 5, 6, 7, 8, 9, 10, 255)

FIG. 10

COMMUNICATION SYSTEM AND METHOD THEREFOR

CROSS-REFERENCE TO RELATED APPLICATION

This application is a continuation application of International Application PCT/JP2010/072462 filed on Dec. 14, 2010, which designated the U.S., the entire contents of which are incorporated herein by reference.

FIELD

The embodiments discussed herein are related to a communication system and a method therefor.

BACKGROUND

One transmission technology supporting backbone networks of optical communication is OTN (Optical Transport Network) standardized by the ITU-T (International Telecommunication Union Telecommunication Standardization Sector).

The OTN is a technique for encapsulating client signals of SONET/SDH (Synchronous Optical Network/Synchronous Digital Hierarchy), Ethernet (registered trademark), or the like, to thereby generate a frame having a hierarchical structure and providing data transmission suitable for WDM (Wavelength Division Multiplexing).

As a conventional technique, there has been proposed a technique of adding synchronization information by inverting predetermined bits of reserved bits (Japanese Laid-open Patent Publication No. 03-201837). Another proposed technique is to use a reserved byte as an identifier for phase adjustment (Japanese Laid-open Patent Publication No. 2004-266480).

Overhead of an OPU (Optical Channel Payload Unit) frame, which is an element of an electrical layer of the OTN, includes a field called PSI (Payload Structure Identifier) indicating information on client signals mapped into a payload area of the OPU frame. The PSI is transmitted with a period of 256 frames.

In the case where a change is made to a payload structure of the OPU at a transmitting end, the PSI is also changed according to the changed payload structure and then transmitted. In this case, a receiving end accepts a new value of the PSI, transmitted with a period of 256 frames, after having received the changed PSI three times in succession.

As a result, it takes a period of time corresponding to up to 768(=256×3) frames from the change to the OPU payload structure at the transmitting end to the acceptance of the new PSI value at the receiving end.

Thus, according to the conventional OTN frame transmission scheme, in the event of a change to information on the payload structure, it takes time for the changed information to be reflected at the receiving end, resulting in a reduction in transmission quality.

SUMMARY

According to an aspect of the embodiments, a communication system includes: a frame transmitting apparatus including a transmitting unit which transmits, when a change is made to a value in a predetermined field of a frame, the frame including the predetermined field with the changed value a predetermined number of times in succession; and a frame receiving apparatus including a receiving unit which receives the frame and an acceptance processing unit which recognizes the value in the predetermined field of the received frame and conducts acceptance processing, wherein the acceptance processing unit compares, when the value in the predetermined field of the received frame is different from a currently accepted value, the value in the predetermined field of the received frame with an expected value, accepts the value in the predetermined field of the received frame when the value in the predetermined field of the received frame matches the expected value, and accepts, when the value in the predetermined field of the received frame does not match the expected value, the value in the predetermined field of the received frame after receiving the same value in the predetermined field the predetermined number of times in succession.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWING

FIG. 7 illustrates an MSI format;
FIG. 8 illustrates MSI encoding;
FIG. 10 illustrates an example of a PSI value.

DESCRIPTION OF EMBODIMENTS

Figure 1:
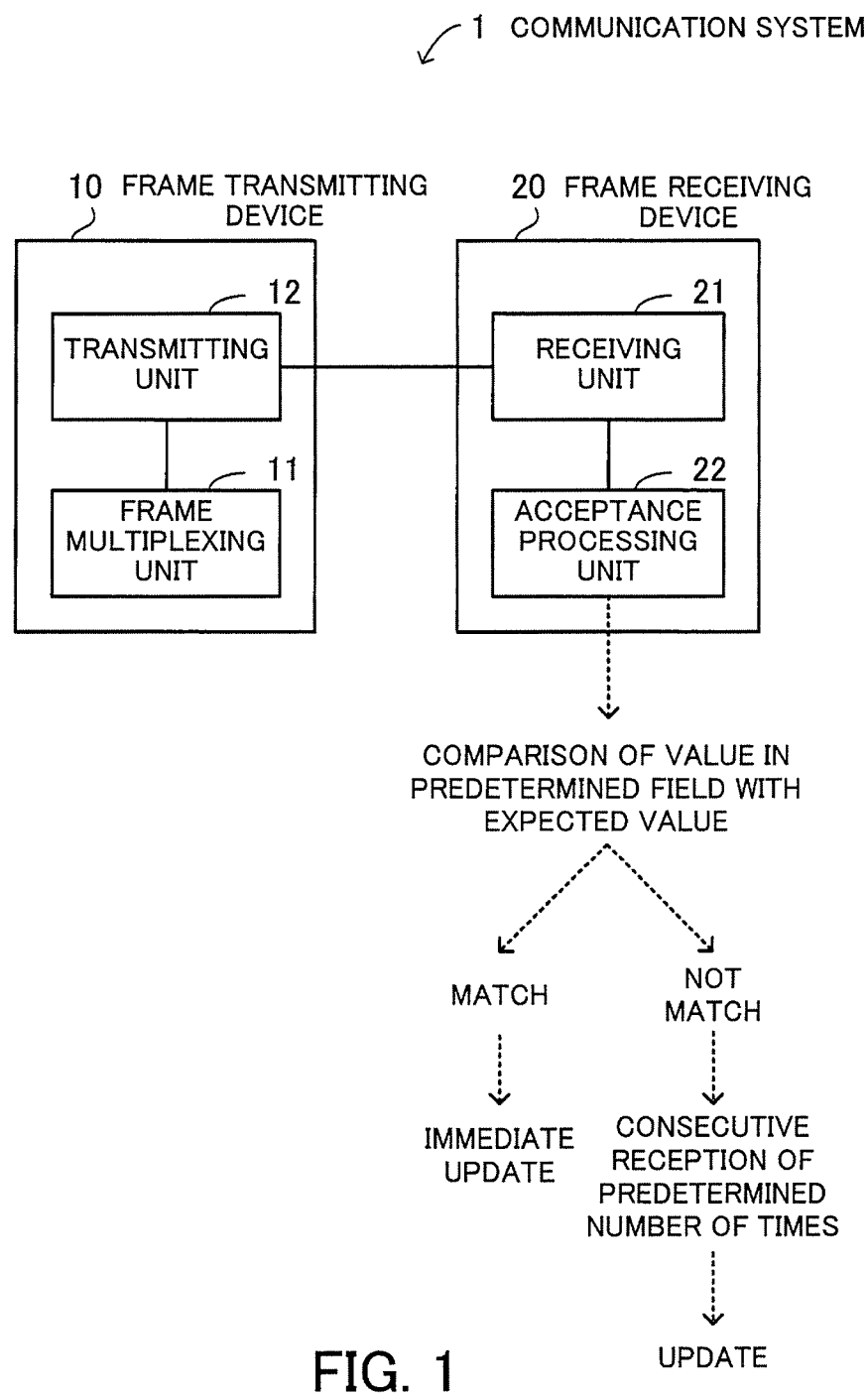
FIG. 1 illustrates a configuration example of a communication system.

Embodiments are described below with reference to the accompanying drawings. FIG. 1 illustrates a configuration example of a communication system. A communication system 1 includes a frame transmitting device 10 and a frame receiving device 20.

In the communication system 1, lower order frames are multiplexed into a higher order frame. In the case where there is a change to a value in a predetermined field of the higher order frame, the higher order frame including the predetermined field with the changed value is transmitted a predetermined number of times in succession, for example.

The frame transmitting device 10 includes a frame multiplexing unit 11 and a transmitting unit 12. The frame multiplexing unit 11 multiplexes and maps lower order frames into a higher order frame. The transmitting unit 12 transmits the higher order frame generated by the frame multiplexing unit 11.

The frame receiving device 20 includes a receiving unit 21 and an acceptance processing unit 22. The receiving unit 21 receives the higher order frame. The acceptance processing unit 22 recognizes a value in the predetermined field of the higher order frame to conduct acceptance processing.

In the case where the received value of the predetermined field is different from a currently accepted value, the acceptance processing unit 22 determines if the received value matches an expected value predicted in advance.

When the received value matches the expected value, the acceptance processing unit 22 immediately updates the currently accepted value to the newly received value of the predetermined field after the first reception. On the other hand, when the received value does not match the expected value, the acceptance processing unit 22 implements the update only after receiving the same value of the predetermined field a predetermined number of times in succession.

Figure 2:
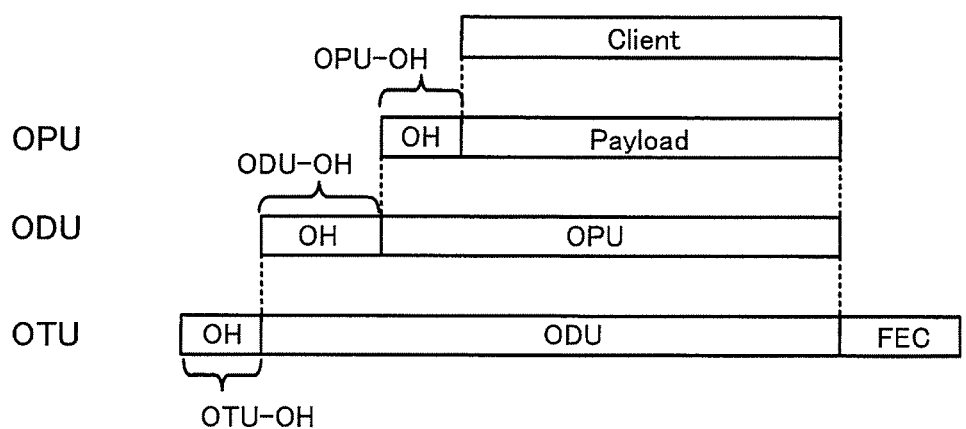
FIG. 2 illustrates a hierarchical structure of an OTN frame.

Next described is a case where the communication system 1 is applied to the OTN. First, an OTN frame structure is described. FIG. 2 illustrates a hierarchical structure of an OTN frame. The OTN frame has a structure with three hierarchical levels, including an OPU frame, an ODU (Optical Channel Data Unit) frame, and an OTU (Optical Channel Transport Unit) frame in the order from lower to higher layers.

The OPU frame is generated by mapping a client signal, such as a SONET/SDH signal or an Ethernet signal, into payload and adding overhead (OH) serving as control information to the payload.

The ODU frame is generated by adding overhead to the OPU frame. Further, the OTU frame is generated by adding overhead and forward error correction (FEC) to the ODU frame.

Figure 3:
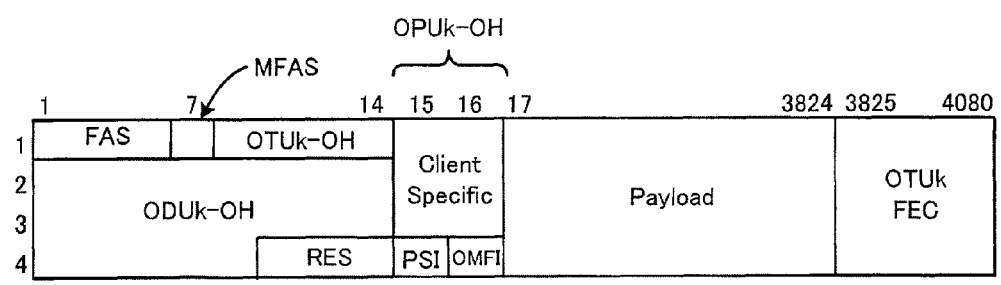
FIG. 3 illustrates an OTU frame format.

FIG. 3 illustrates an OTU frame format. The OPU frame includes OPUk-OH and payload, and the OPUk-OH includes information for client specific purposes, a PSI, and an OMFI (OPU Multi Frame Identifier).

ODUk-OH is added to the OPU frame to thereby form the ODU frame (a RES (Reserved) field is included in the ODUk-OH).

Further, a FAS (Frame Alignment Signal), an MFAS (Multi-Frame Alignment Signal), and OTUk-OH are added to the header of the ODU frame while OTUk FEC is added to the end of the payload, to thereby generate the OTU frame.

As for ODUk interfaces, k(=0, 1, 2, 3, 4) is defined according to the transmission rate: ODU0=1.244 Gbps; ODU1=2.498 Gbps; ODU2=10.037 Gbps; ODU3=40.319 Gbps; and ODU4=104.794 Gbps.

In the OTU frame, the overhead area has a frame size of 16 bytes in columns 1 to 16 by 4 rows. The payload area has a frame size of 3808 bytes in columns 17 to 3824 by 4 rows, and the FEC area has a frame size of 256 bytes in columns 3825 to 4080 by 4 rows.

The FAS is defined in row 1, columns 1 to 6, indicating the head of the frame. The MFAS is defined in row 1, column 7, indicating a frame sequence number ranging from 0 to 255. The OTUk-OH is defined in row 1, columns 8 to 14.

The ODUk-OH is defined in rows 2 to 4, columns 1 to 14, including the RES which is a field not in use.

The OPUk-OH is defined in rows 1 to 4, columns 15 and 16. The PSI in the OPUk-OH is defined in row 4, column 15, indicating information on the payload structure. The OMFI in the OPUk-OH, allocated only in an OPU4 frame, is defined in row 4, column 16. The value of the OMFI byte is incremented between 0 and 79, providing position identification in the multiframe structure.

Next described are lower order ODU (LO-ODU) and higher order ODU (HO-ODU) frames. In recent years, considerable discussion has been given to OTN evolution concerning how to encapsulate various kinds of client signals while maintaining interoperability with the existing hierarchical structure to thereby realize efficient data transmission.

One example of the OTN evolution drawing attention is a client encapsulating method using LO-ODU and HO-ODU frames. This method improves flexibility of client signal encapsulation by multiplexing and mapping, as client signals, not only data signals of SONET/SDH, Ethernet, and the like, but also signals having a frame structure.

Figure 4:
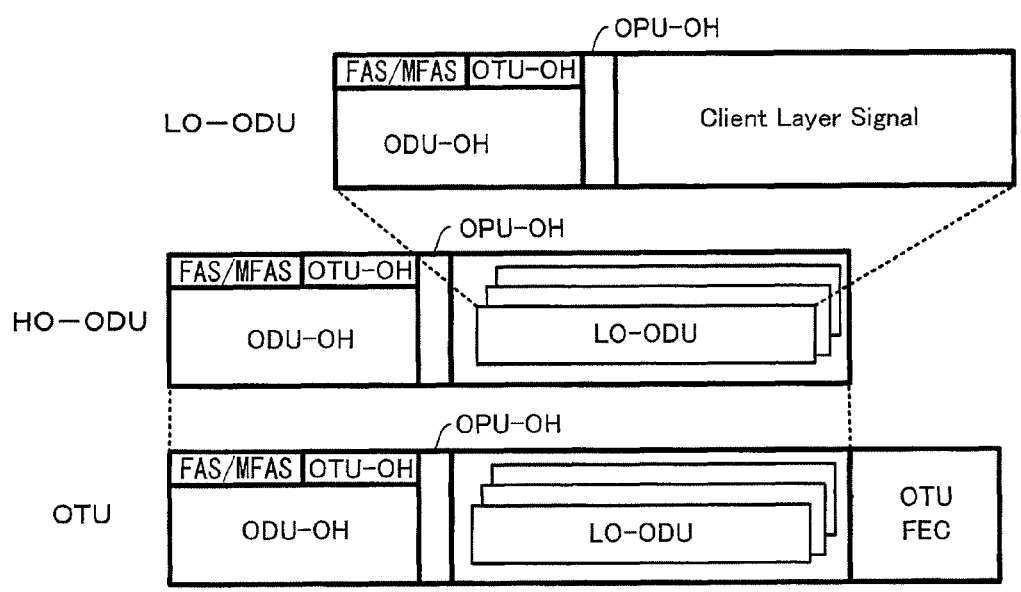
FIG. 4 illustrates LO-ODU frames multiplexed and mapped into an HO-ODU frame.

FIG. 4 illustrates LO-ODU frames multiplexed and mapped into an HO-ODU frame. Each of the LO-ODU frames is a frame into which a client signal is directly mapped, and the HO-ODU frame is a frame into which the LO-ODU frames are mapped. The LO-ODU frames are multiplexed and mapped into a payload area of the HO-ODU frame for transmission, and frame synchronization of the LO-ODU frames is detected for monitoring at the receiving end.

Figure 5:
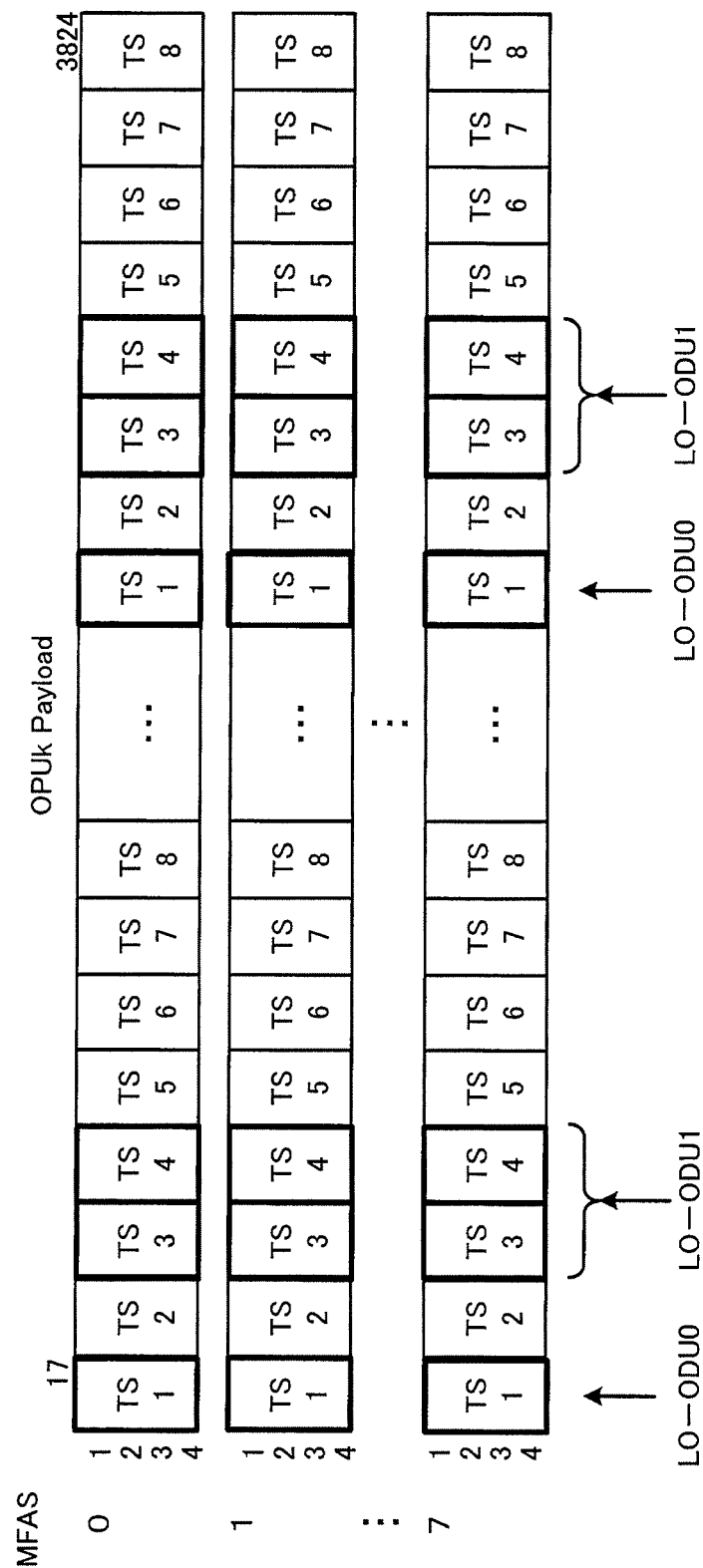
FIG. 5 illustrates a mapping example of the LO-ODU frames.

FIG. 5 illustrates a mapping example of LO-ODU frames. The example represents a case in which LO-ODU0($\approx$1.25 Gbps) and LO-ODU1($\approx$2.5 Gbps) are mapped into HO-ODU2($\approx$10 Gbps).

The LO-ODU frames are mapped into tributary slots (TSs) formed by dividing the payload area of the HO-ODU frame. There are two sizes of tributary slots, 1.25 Gbps and 2.5 Gbps. In this example with mapping of LO-ODU0, tributary slots with a granularity of 1.25 Gbps are used.

The number of tributary slots changes according to the HO-ODU type and the granularity of the tributary slots. ODU2 payload is divided into eight 1.25 G tributary slots (TS1 to TS8). A tributary slot is allocated to each column of the ODU payload area, which is repeated until the allocation of TS1 to TS8 is made for the entire payload area.

LO-ODU0 and LO-ODU1 are mapped into HO-ODU2, occupying one tributary slot and two tributary slots, respectively. In this example, LO-ODU0 is assigned to TS1 and LO-ODU1 is assigned to TS3 and TS4.

A multiframe is made up of multiple HO-ODU2 frames needed to transmit one LO-ODU frame. In this example, one multiframe is made up of eight HO-ODU2 frames. The MFAS is used in order to identify the position of each HO-ODU frame in the multiframe.

A single MFAS byte is defined in the overhead area and provides a sequence number of a corresponding frame, starting from 0 and being incremented by 1 for each frame. In the case of the example here, the position of each HO-ODU frame in the multiframe is identified using the lower 3 bits of the MFAS.

Note however that in the case of HO-ODU4, eighty tributary slots are allocated and one multiframe is made up of eighty ODU4 frames. Therefore, only in the OPU4 frame structure, the aforementioned OMFI field is allocated in the OPUk overhead, and the value of the OMFI byte is incremented between 0 and 79, by which the position of each ODU4 frame is identified in the multiframe.

Figure 6:
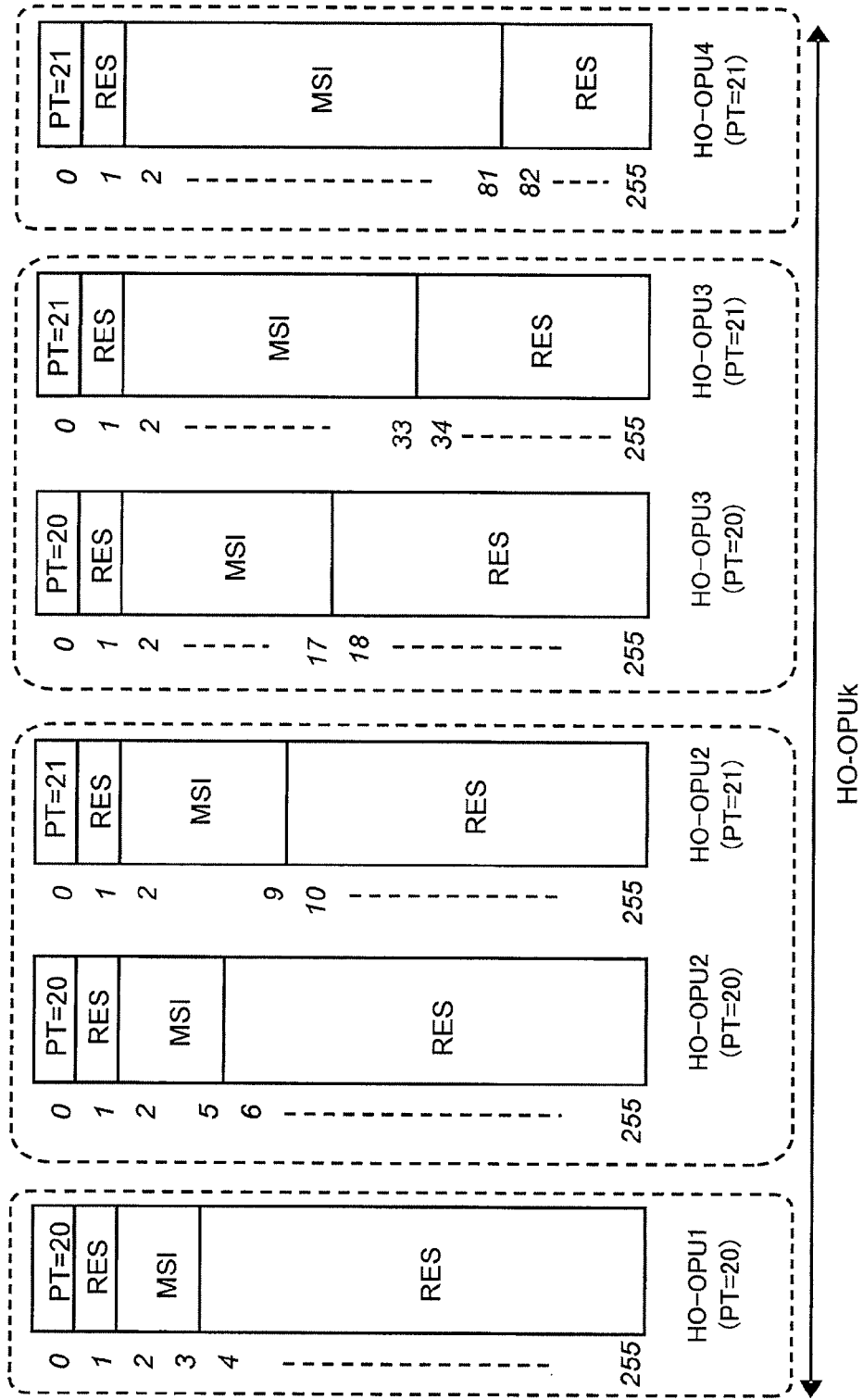
FIG. 6 illustrates PSI formats.

Formats of the PSI are described next. FIG. 6 illustrates PSI formats: a PSI format for HO-OPU1 with payload type 20 (PT=20); PSI formats for HO-OPU2 with PT=20 and with PT=21; PSI formats for HO-OPU3 with PT=20 and with PT=21; and a PSI format for HO-OPU4 with PT=21.

The PSI field in the HO-OPUk overhead indicates information on the payload structure. The PSI is composed of 256 bytes, and is transmitted once every 256 frames in accordance with the MFAS (i.e., the PSI is transmitted with a period of 256 frames). The PSI includes a payload type (PT) and an MSI (Multiplex Structure Identifier).

The payload type indicates information on composition of the payload. It is defined to use PT=20 or PT=21 in the case of an HO-OPU frame with LO-ODU frames mapped thereto. In addition, the MSI is included only in an HO-OPU frame, and carries information (position information) on LO-ODU frames of individual tributary slots.

A format and encoding of the MSI are described next. FIG. 7 illustrates an MSI format. The represented MSI format is used for HO-OPU1, HO-OPU2, and HO-OPU3. Bits 1 and 2 indicate an ODTU (Optical Channel Data Tributary Unit) type, and bits 3 to 8 indicate a tributary port number.

The MSI is located in PSI[2] to PSI[(n+2)] (n is the number of tributary slots) of the PSI bytes (PSI[#] (PSI number) is in accordance with the MFAS). According to the example of FIG. 5, the MSI is located in PSI[2] to PSI[10] (MFAS=PSI in PSI[2] to PSI[10]) since n=8.

Each byte of the MSI holds information about an LO-ODU frame carried in each tributary slot. For example, PSI[2] used as an MSI byte holds information about an LO-ODU frame carried in TS1, and PSI[3] used as an MSI byte holds information about an LO-ODU frame carried in TS2.

Note that an MSI format for HO-OPU4 is different from the MSI format of FIG. 7. Bit 1 is a flag indicating if the tributary slot is allocated or unallocated, and bits 2 to 8 indicate a tributary port number.

FIG. 8 illustrates MSI encoding. LO-ODU frames are mapped into an HO-ODU frame after being mapped into an ODTUjk (ODTU j into k) layer or an ODTUk.ts (ODTU k with ts (tributary slots)) layer. Each tributary port number is used as an identifier of a corresponding LO-ODU frame.

Note that the notation "ODTUjk" denotes that ODUj is mapped into ODUk. For example, ODU1 being mapped into ODU2 is denoted as ODTU12. In the case of ODTU12, the ODTU type is encoded as "00" if the OPU type is OPU2. Therefore, in the case where the OPU type is OPU2 and the ODTU type is "00", it is understood that tributary slots having corresponding tributary port numbers carry LO-ODU1 mapped into HO-ODU2.

The notation "ODTUk.ts" denotes that ODU0 is mapped into ODUk. For example, ODU0 being mapped into ODU2 is denoted as ODTU2.ts. In the case of ODTU2.ts, the ODTU type is encoded as "10" if the OPU type is OPU2. Therefore, in the case where the OPU type is OPU2 and the ODTU type is "10", it is understood that a tributary slot having a corresponding tributary port number carries LO-ODU0 mapped into HO-ODU2.

Figure 9:
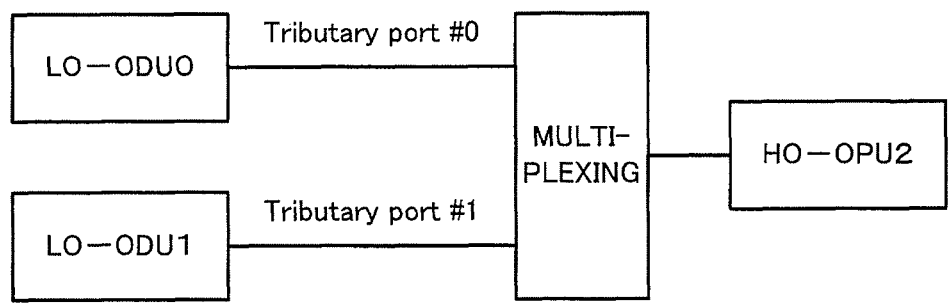
FIG. 9 illustrates Tributary Port numbers.

FIG. 9 illustrates tributary port numbers. Each tributary port number serves as an identification number of an LO-ODU frame in the case where multiple types of LO-ODU frames are multiplexed and mapped into an HO-ODU frame. According to the example of FIG. 5, LO-ODU0 and LO-ODU1 are mapped into HO-ODU2. In this case, for example, Tributary Port #0 is used as an identification number of LO-ODU0 and Tributary Port #1 is used as an identification number of LO-ODU1.

FIG. 10 illustrates an example of a PSI value, transmitted in the case of FIG. 5. In this example, PT=21 is used for the HO-OPU2 transmission.

Since TS1 carries LO-ODU0, "10" is set in bits 1 and 2 of the MSI. In the case of using Tributary Port #0, "000000" is set in bits 3 to 8 of the MSI.

Since TS3 and TS4 carry LO-ODU1, "00" is set in bits 1 and 2 of the MSI. In the case of using Tributary Port #1, "000001" is set in bits 3 to 8 of the MSI. Since the remaining TS2 and TS5 to TS8 are not allocated, "11" is set in bits 1 and 2 of the MSI. For their tributary port numbers, "NA" (NOT APPLICABLE) is set.

The communication system 1 applied to the OTN frame transmission is described next in detail. In the communication system 1, LO-ODU frames are multiplexed into an HO-ODU frame. In the case where a change is made to a value in the PSI field of the HO-ODU frame, the HO-ODU frame including the changed value is transmitted a predetermined number of times in succession, for example.

Figure 11:
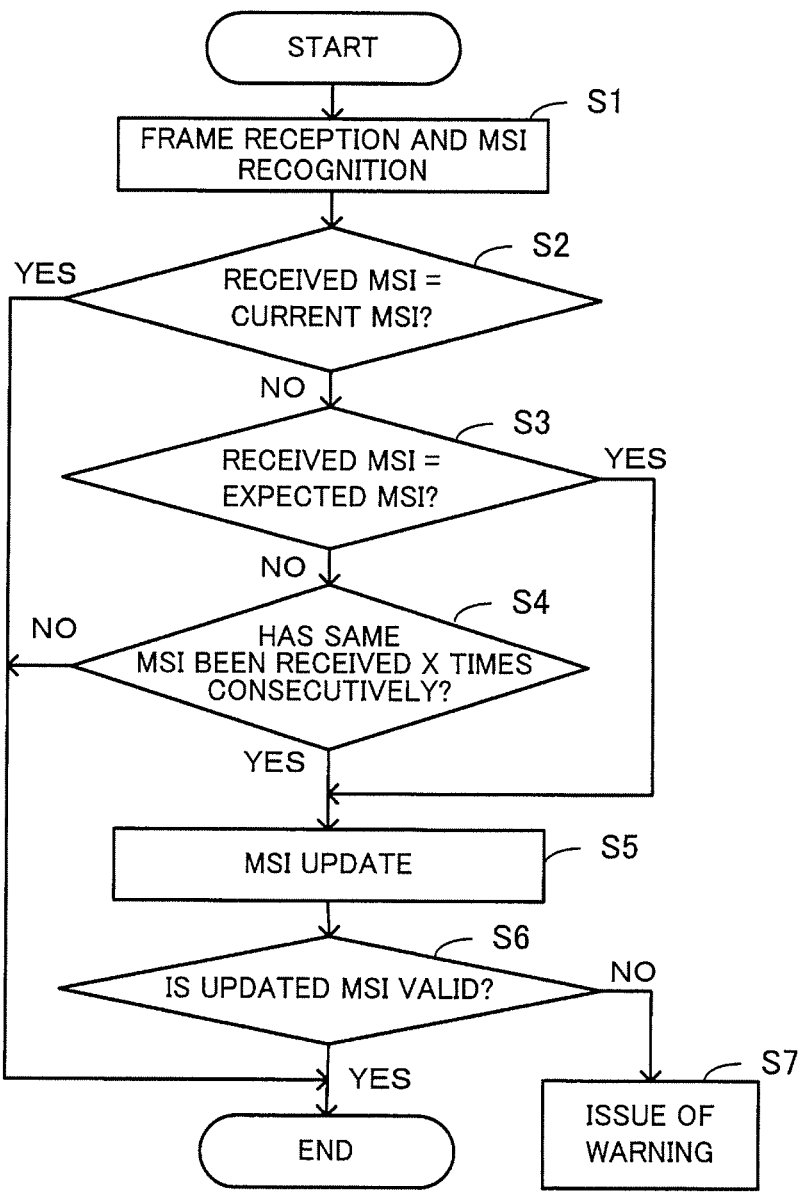
FIG. 11 is a flowchart illustrating an acceptance processing operation carried out in the communication system.

FIG. 11 is a flowchart illustrating an acceptance processing operation carried out in the communication system 1. Specifically, the flowchart represents an acceptance processing operation of the receiving end in terms of the MSI included in the PSI and carrying position information of lower order frames.

[S1] The receiving unit 21 receives an HO-ODU frame. The acceptance processing unit 22 recognizes the MSI (the value in the predetermined field) in the HO-ODU frame.

[S2] The acceptance processing unit 22 determines whether the received MSI matches a currently accepted MSI (i.e., determines whether the payload structure mapped into the HO-ODU frame is the same as a currently accepted payload structure). If the received MSI matches the currently accepted MSI, the process is ended. If not, the process moves to step S3.

[S3] The acceptance processing unit 22 determines whether the received MSI matches an expected value predicted in advance (for example, a field value of a working path). If the received MSI matches the expected value, the process moves to step S5. If not, the process moves to step S4.

[S4] The acceptance processing unit 22 determines whether to have received the same MSI X times (a predetermined number of times, for example, three times) in succession. If the acceptance processing unit 22 has received the same MSI X times in succession, the process moves to step S5. If not, the process is ended.

[S5] The acceptance processing unit 22 updates the currently accepted MSI with the new MSI.

[S6] The acceptance processing unit 22 determines whether the updated MSI is valid. If the updated MSI is valid, the process is ended. If not, the process moves to step S7.

[S7] The acceptance processing unit 22 gives an operator notice by issuing a warning.

The acceptance processing unit 22 stores, in a database, each MSI in association with an identifier of a working path in which the MSI is used. Then, in the case where the MSI of a protection path is changed, the acceptance processing unit 22 identifies a working path with a failure, and searches in the database for an MSI associated with the identifier of the identified working path. The acceptance process unit 22 subsequently determines whether the changed MSI matches the searched MSI.

Figure 12:
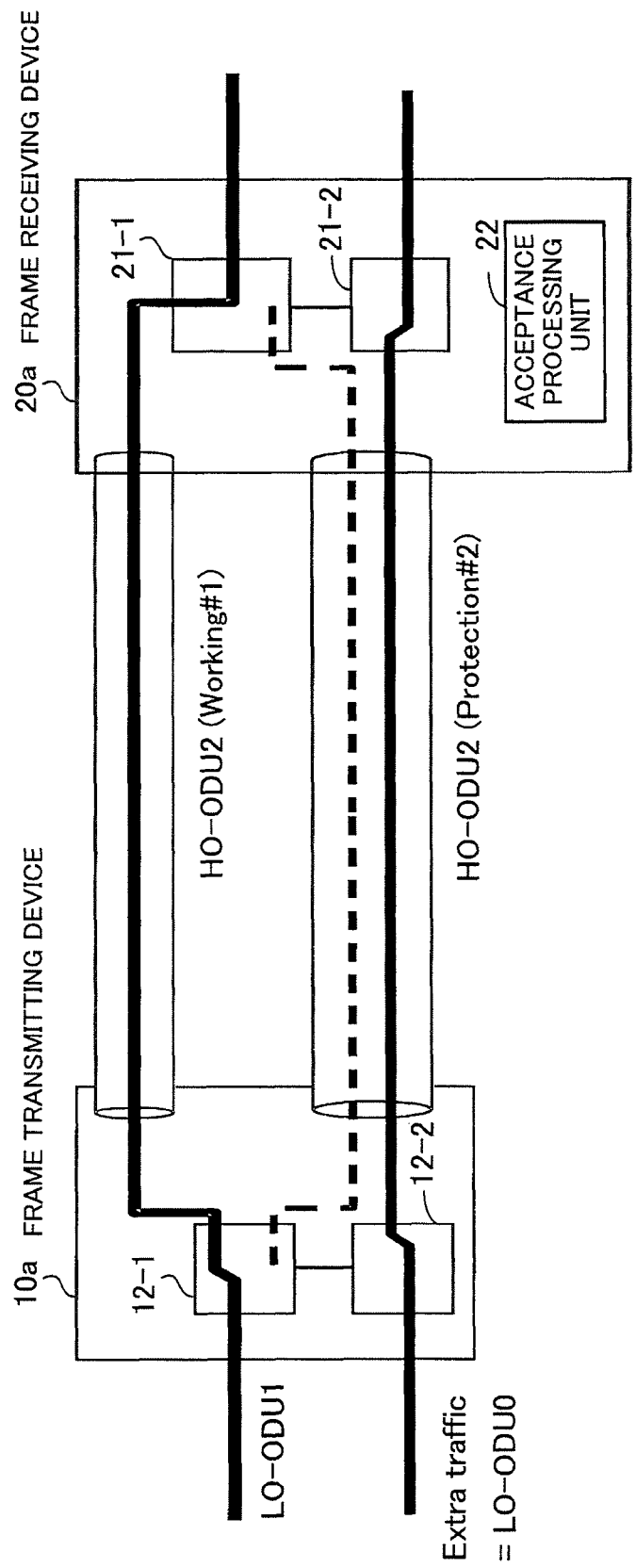
FIG. 12 illustrates a configuration example of a protection scheme.

The MSI prediction and the acceptance processing are described next, taking 1:n Bidirectional Linear protection switching as an example. FIG. 12 illustrates a configuration example of a protection scheme. In the 1:n Bidirectional Linear protection configuration, n working paths and one protection path are established between a transmitting device and a receiving device (i.e., between nodes), and in the event of a failure on one of the working paths, the frame flow path is switched from the failed working path to the protection path.

A frame transmitting device 10a includes transmitting units 12-1 and 12-2, and a frame receiving device 20a includes receiving units 21-1 and 21-2. A working path #1 is established between the transmitting unit 12-1 and the receiving unit 21-1, and a protection path #2 is established between the transmitting unit 12-2 and the receiving unit 21-2.

Since the protection path #2 is in an idle state under normal operation, assume that the transmitting unit 12-2 transmits HO-ODU2 with unprotected extra traffic (LO-ODU0) multiplexed therein to the receiving unit 21-2.

Also assume that protected normal traffic (LO-ODU1) is multiplexed by the transmitting unit 12-1 into HO-ODU2, which is transmitted to the receiving unit 21-1 via the working path #1.

In the event of a failure on the working path #1, the flow path for transmitting HO-ODU2 with the normal traffic (LO-ODU1) multiplexed therein is switched to the protection path #2. Since the traffic transmitted on the protection path #2 is changed from LO-ODU0 to LO-ODU1 in the flow path switchover, the frame transmitting device 10a needs to change the PSI (MSI) information of HO-ODU2 transmitted on the protection path #2.

The acceptance processing unit 22 of the frame receiving device 20a preliminarily stores, in a memory, the MSI in the PSI of HO-ODU2 transmitted on the working path #1 prior to the failure (i.e., HO-ODU2 including the normal traffic (LO-ODU1)).

When the flow path for the normal traffic (LO-ODU1) is switched to the protection path #2 after the failure on the working path #1, the acceptance processing unit 22 recognizes the MSI of HO-ODU2 transmitted on the protection path #2 after the flow path switchover, and compares the received MSI with an expected MSI which is the MSI stored in the memory.

The received MSI matches the expected MSI because both are position information of the normal traffic (LO-ODU1), and the acceptance processing unit 22 immediately updates a currently accepted MSI to the received MSI. With this, the update is implemented after the first reception of the MSI, greatly reducing the acceptance processing time. In addition, LO-ODU1 mapped into HO-ODU2 transmitted on the protection path #2 is extracted accurately.

Figure 13:
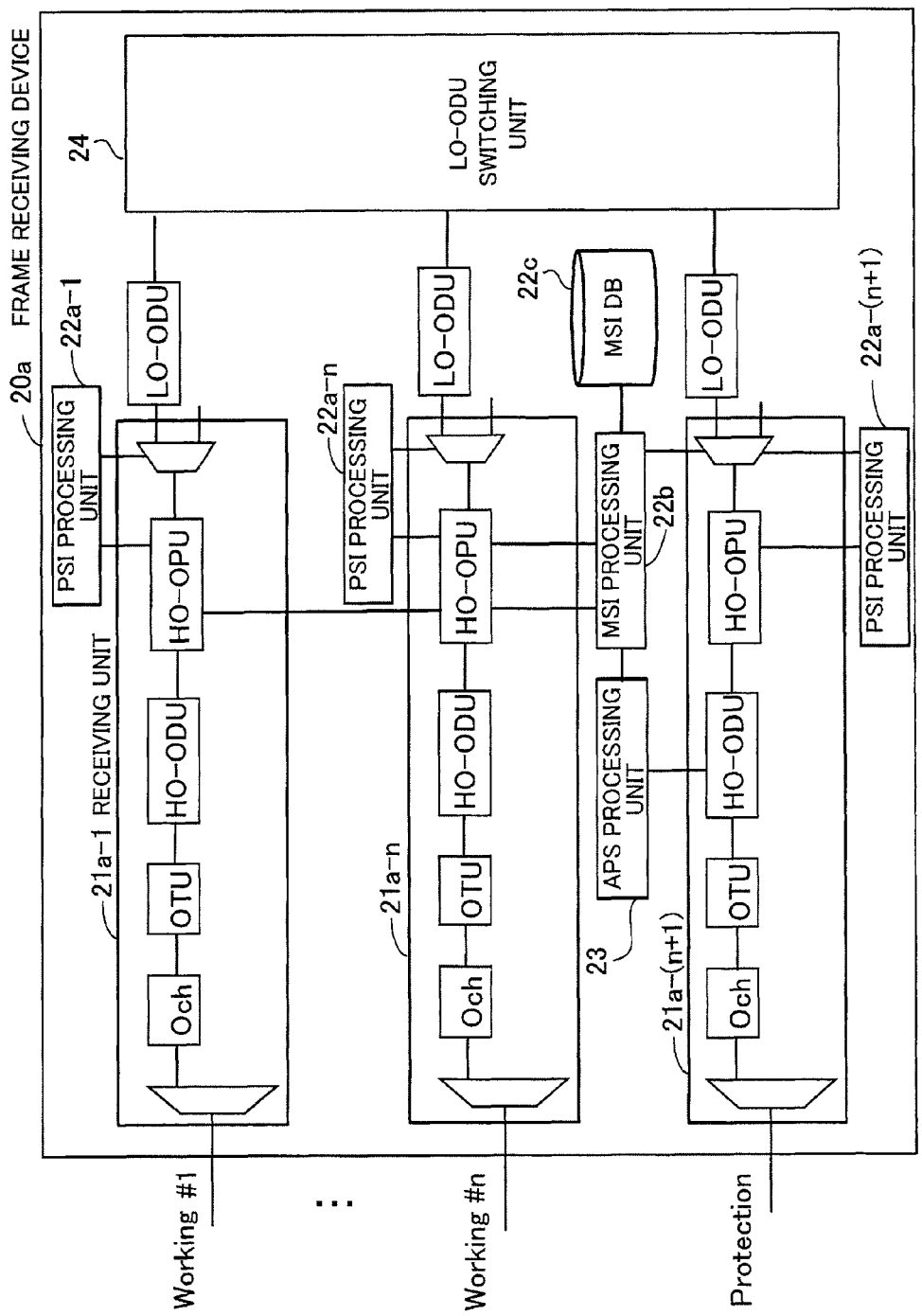
FIG. 13 illustrates a configuration example of a frame receiving device.

FIG. 13 illustrates a configuration example of the frame receiving device 20a. The frame receiving device 20a includes receiving units 21a-1 to 21a-(n+1), PSI processing units 22a-1 to 22a-(n+1), an MSI processing unit 22b, an MSI database 22c, an APS (Automatic Protection Switch) processing unit 23, and an LO-ODU switching unit 24.

The functions of the PSI processing units 22a-1 to 22a-(n+1), the MSI processing unit 22b, and the MSI database 22c are included in the acceptance processing unit 22. Note that the receiving units 21a-1 to 21a-(n+1) and the PSI processing units 22a-1 to 22a-(n+1) are hereinafter sometimes collectively referred to as the receiving unit 21a and the PSI processing unit 22a, respectively.

The receiving units 21a-1 to 21a-n are provided in one-to-one correspondence with working paths #1 to #n while the receiving unit 21a-(n+1) is provided in correspondence with a protection path. The receiving unit 21a receives a WDM signal light transmitted via a corresponding path, and demultiplexes the WDM signal light into signals of respective wavelengths (channels) and then outputs the signals (output of an Och (Optical channel)). Subsequently, the receiving unit 21a optical/electrical-converts the signals to thereby output an OTU frame for each channel.

After carrying out a predetermined process associated with the OTU-OH of each OTU frame, the receiving unit 21a converts the OTU frame into an HO-ODU frame by removing the OTU-OH from the OTU frame. Subsequently, the receiving unit 21a carries out a predetermined process associated with the ODU-OH of the HO-ODU frame, and then converts the HO-ODU frame into an HO-OPU frame by removing the ODU-OH from the HO-ODU frame. Further, the receiving unit 21a separates an LO-ODU frame multiplexed into the HO-OPU frame and outputs the LO-ODU frame.

The PSI processing unit 22a extracts a PSI from the HO-OPU frame, and recognizes values in the respective PSI fields, updates the values, and checks whether the updated values are valid. Based on the values obtained after the series of processes of the PSI processing unit 22a, the LO-ODU frame is separated from the HO-OPU frame.

The APS processing unit 23 is configured to detect a failure and switch the frame flow path from a working path to a protection path in the event of a failure on the working path. In addition, the APS processing unit 23 extracts an MSI from an HO-ODU frame transmitted on the protection path after the flow path switchover and transmits the MSI to the MSI processing unit 22b.

The MSI processing unit 22b extracts MSIs from individual HO-OPU frames transmitted on the working paths #1 to #n and stores the MSIs in the MSI database 22c. Subsequently, the MSI processing unit 22b compares the MSI notified of by the APS processing unit 23 and an MSI stored in the MSI database 22c (i.e., expected MSI). When the two match, the MSI processing unit 22b updates a currently accepted MSI to the notified MSI. Based on the updated MSI, an LO-ODU frame is separated from an HO-OPU frame transmitted on the protection path. The LO-ODU switching unit 24 receives multiple LO-ODU frames transmitted on the individual paths and sequentially outputs the LO-ODU frames to a predetermined destination.

Thus, according to the communication system 1 described above, in the case where the MSI of a received HO-ODU frame is different from a currently accepted value, it is determined whether the MSI matches an expected value predicted in advance. If the two match, the currently accepted value is immediately updated to the received MSI.

According to conventional technologies, in the case where a change is made to the position information (MSI) of LO-ODUj mapped into HO-OPUk, it takes a long time for the changed information to be reflected at the receiving end. In addition to the PSI being transmitted with a period of 256 frames, the receiving end accepts a new PSI value after receiving the same PSI value three times in succession (in order to prevent instability due to bit errors in transmission, an incorrect setting at the transmitting end, or the like).

As a result, it takes a period of time corresponding to up to 768 (=256×3) frames from the change made in the OPUk payload structure at the transmitting end to the acceptance of the new PSI value at the receiving end. In the case of HO-OPU2, for example, it takes 9.3 ms.

In the case of HO-OPU4 where one LO-ODUj frame is transmitted in 80 frames, the PSI with a change made thereto is available once every 1280 frames since the head of a multiframe consisting of the 80 frames is aligned with the head of the PSI. As a result, in the case of HO-OPU4, it takes a period of time corresponding to (1280×3) frames.

On the other hand, in the above-described communication system 1, an MSI to be received in case of a change to the payload structure due to a failure or the like is expected in advance, and then, a received MSI is compared with the expected value. If the two match, an immediate update takes place to set the received MSI as a new accepted value. With this, it is possible to greatly reduce the MSI acceptance processing time, in turn improving transmission quality.

As a modification of the above-described embodiment, MSIs may be stored in a database, and if a change is made to an MSI on the protection path, the changed MSI may be sequentially compared with each of the MSIs in the database to determine whether there is a match.

Next described is another embodiment for reducing a period of time from a change to the MSI at the transmitting end to acceptance of the changed MSI at the receiving end. According to the above-described embodiment, the acceptance processing time is reduced by comparing the received MSI with the expected MSI at the frame receiving end. On the other hand, according to this embodiment, a reduction in the acceptance processing time is achieved by control at the frame transmitting end.

In a communication method of multiplexing lower order frames into higher order frames at the frame transmitting end to form a multiframe consisting of N higher order frames for transmission, position information of the lower order frames is transmitted not in accordance with N-frame period transmission of a field including payload structure information of the higher order frames. In this case, the following control operation (1), (2), or (3) is implemented.

(1) MSI Transmission with MSI Field Provided in Overhead

Figure 14:
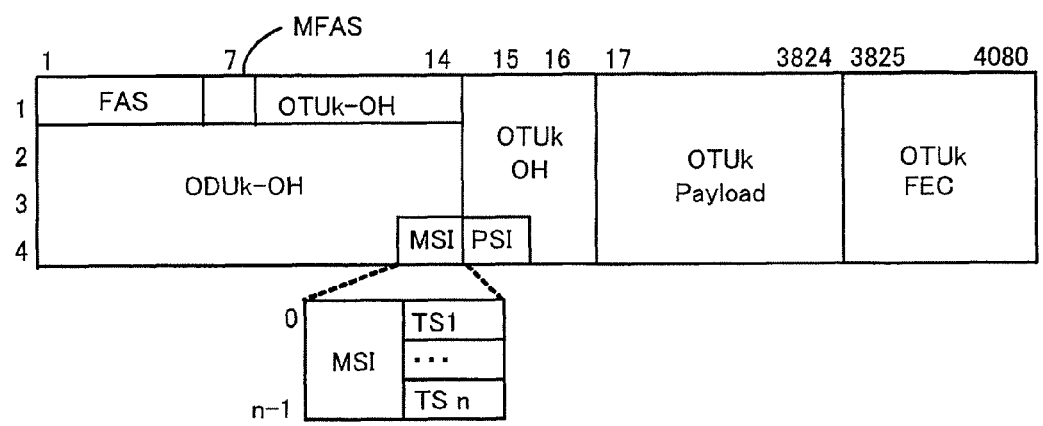
FIG. 14 illustrates an example where an MSI field is provided in overhead.

FIG. 14 illustrates an example where the MSI field is provided in overhead. The OPUk-OH is extended, and the RES field in the ODUk-OH is used for transmitting the MSI. An MSI in the new MSI field is consecutively transmitted independent of the PSI transmission period.

In the case of OPU2 (1.25 G tributary slots, PT=21), for example, the MSI is transmitted with a period of 8 frames. As for up to ODU3, the MSI transmission is made in accordance with the MFAS, and as for ODU4, the MSI transmission is made in accordance with the OMFI. For the accordance with the MFAS, lower bits of the MFAS are extracted and used.

For example, in the case of OPU2 (PT=21), a value of the lower 3 bits extracted from the MFAS is associated with the MSI. The MSI associated with the lower 3 bits of the MFAS being "000" provides information on TS1; the MSI associated with the lower 3 bits of the MFAS being "001" provides information on TS2; . . . ; and the MSI associated with the lower 3 bits of the MFAS being "111" provides information on TS8 (the format of the MSI follows existing technology).

With this, the MSI is transmitted with a period of 8 frames (in the case of ODU2 multiplexed into OPU2 with PT=21), instead of a period of 256 frames, which results in a reduction in the acceptance processing time at the receiving end.

(2) MSI Transmission with MSI Provided in PSI RES Field

Figure 15:
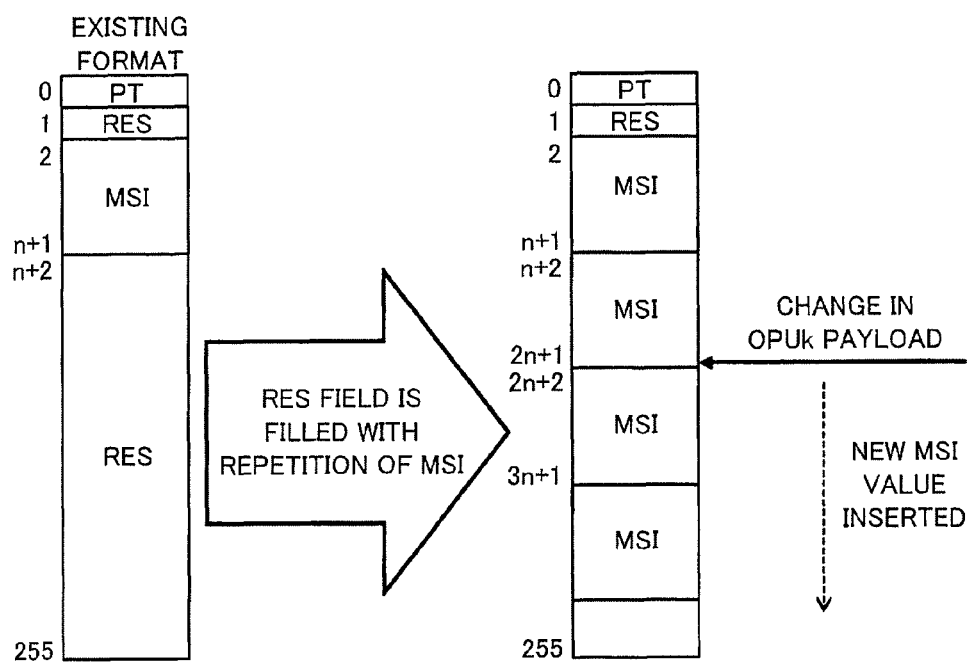
FIG. 15 illustrates MSI transmission using a PSI RES field.

FIG. 15 illustrates MSI transmission using the PSI RES field. The RES field included in the PSI field is used to contain MSI fields. As a change is made to the payload structure of an HO-OPUk frame, a new MSI value is inserted into the PSI.

In the case of using the RES field of the PSI to contain MSI fields and repeatedly transmitting an MSI value in the RES field, a new MSI value is inserted at the time when a change is made to the structure of LO-ODUj mapped into the payload due to, for example, flow path switchover following a failure event.

Repeatedly transmitting the MSI value in the RES field of the PSI as described above enables a reduction in the acceptance processing time at the receiving end.

Note that, instead of transmitting the MSI always repeatedly, the transmission of a new MSI value may be started from the point at which a change is made to the payload structure of the HO-OPUk frame. In this case, the start of the new MSI value needs to be clearly indicated. In general, the RES field value is fixed to all-0s, however, the MSI may also consist of all-0s. Therefore, a method for discriminating between the RES and the MSI needs to be provided.

Figure 16:
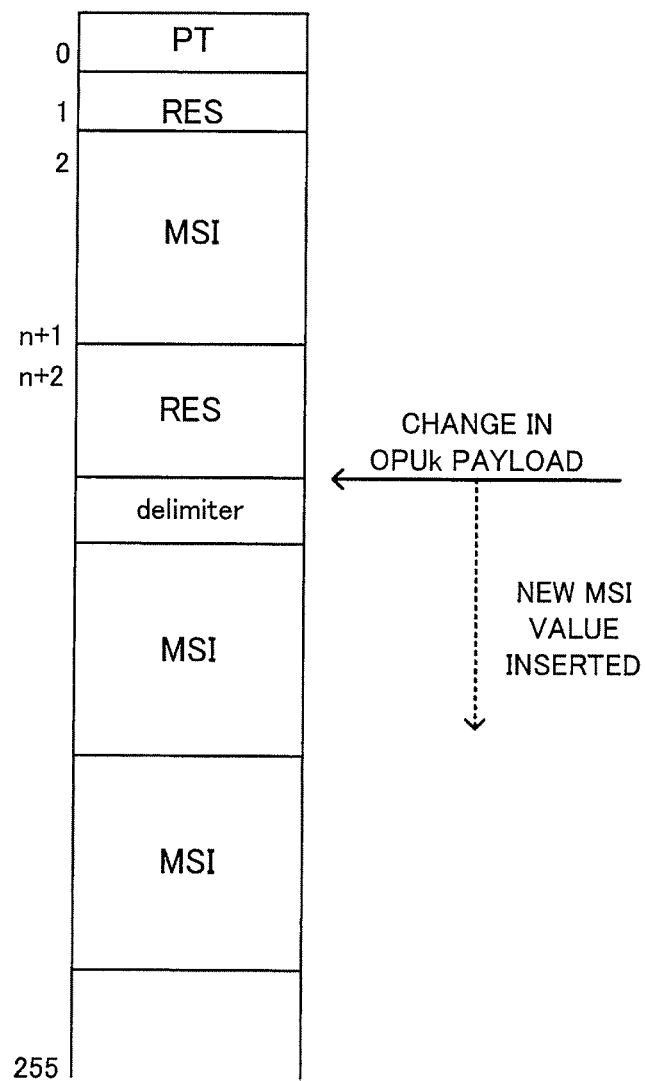
FIG. 16 illustrates MSI transmission using the PSI RES field with a delimiter.

FIG. 16 illustrates MSI transmission using the PSI RES field with a delimiter. As illustrated in FIG. 16, a specific bit pattern is used as an MSI start delimiter indicating that the MSI starts at the byte following the delimiter byte. This enables discrimination between the RES and the MSI.

Another method would be to change the definition of "ODTU type=00" of the MSI in the RES field to be "tributary slot unallocated" so that a non-all-0s sequence is recognized as the MSI. Alternatively, the RES field value of the PSI is set to all-1s so that a non-all-1s sequence would be recognized as the MSI.

(3) MSI Transmission with MSI Provided in HO-ODUk Payload

Figure 17:
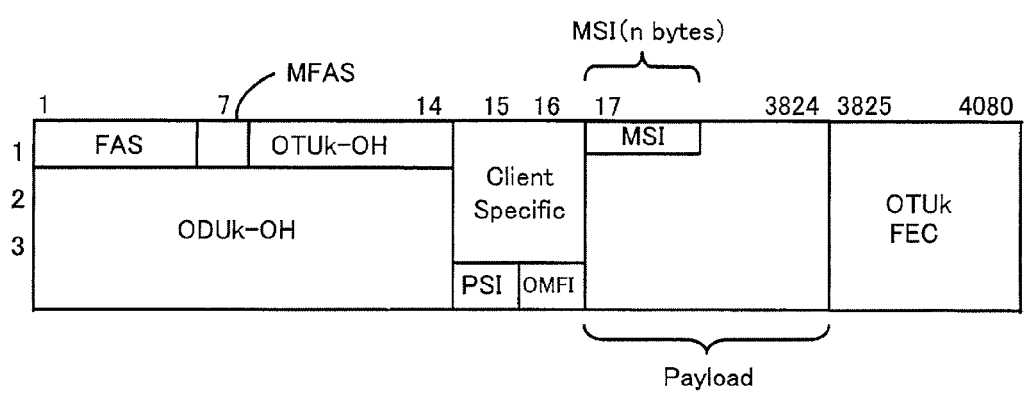
FIG. 17 illustrates MSI transmission with the MSI field provided in payload.

FIG. 17 illustrates MSI transmission with the MSI field provided in payload. As illustrated in FIG. 17, the MSI is transmitted in the payload. In this case, the MSI of n bytes is transmitted in one ODUk frame since there is no need to transmit the MSI in the multiframe structure, enabling a reduction in the acceptance processing time.

As for flow path switchover as a protection scheme, a frame with the MSI inserted into the payload is transmitted on the protection path from the time a failure is detected to the flow path switchover. Note that when a failure occurs, the transmitting and receiving ends make necessary coordination for the flow path switchover to prevent improper connection of the protection path.

Therefore, null traffic is carried over the protection path until normal traffic that needs to be protected actually starts to flow through the protection path. Since the payload of the null traffic is not user traffic, it is possible to transmit the MSI inserted into the payload for the period from the failure detection to the flow path switchover.

In the case of implementing the above-described control operation (1), (2), or (3) at the frame transmitting end, for example, a BIP (Bit Interleaved Parity)-8 checksum may be attached to the MSI value to thereby allow the frame receiving end to detect an error that may have occurred after transmission.

In addition, in the case of implementing the above-described control operation (1), (2), or (3) at the frame transmitting end, the frame receiving end may accept a new MSI value after the first reception, or may accept it only after receiving the same value X times. Alternatively, the frame receiving end may accept it if the new MSI value matches an expected value.

As described above, according to the above-described embodiments, it is possible to reduce a period of time from a change to the ODUk payload structure at the transmitting end to acceptance of the change at the receiving end, which improves transmission quality. In addition, the reduction in the acceptance processing time results in reducing the time taken for flow path switchover in the protection scheme.

According to the above-described communication system, it is possible to improve transmission quality.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that various changes, substitutions, and alterations could be made hereto without departing from the spirit and scope of the invention.

What is claimed is:

1. A communication system comprising:
a frame transmitting apparatus including a transmitting unit which transmits, when a change is made to a value in a predetermined field of a frame, the frame including the predetermined field with the changed value a predetermined number of times in succession; and
a frame receiving apparatus including a receiving unit which receives the frame and an acceptance processing unit which recognizes the value in the predetermined field of the received frame and conducts acceptance processing,
wherein the acceptance processing unit
compares, when the value in the predetermined field of the received frame is different from a currently accepted value, the value in the predetermined field of the received frame with an expected value,
accepts the value in the predetermined field of the received frame when the value in the predetermined field of the received frame matches the expected value, and
accepts, when the value in the predetermined field of the received frame does not match the expected value, the value in the predetermined field of the received frame after receiving the same value in the predetermined field the predetermined number of times in succession.

2. The communication system according to claim 1, wherein when a flow path for the frame is switched from a working path to a protection path established between the frame transmitting apparatus and the frame receiving apparatus, the acceptance processing unit implements the comparison in which a value in the predetermined field of a frame received via the protection path is compared with the expected value that is a value in the predetermined field of a frame received via the working path.

3. A frame receiving apparatus comprising:
a receiving unit configured to receive, when a change is made to a value in a predetermined field of a frame at a transmitting end, the frame including the predetermined field with the changed value and transmitted a predetermined number of times in succession; and
an acceptance processing unit configured to recognize the value in the predetermined field of the received frame and conduct acceptance processing,
wherein the acceptance processing unit
compares, when the value in the predetermined field of the received frame is different from a currently accepted value, the value in the predetermined field of the received frame with an expected value,
accepts the value in the predetermined field of the received frame when the value in the predetermined field of the received frame matches the expected value, and
accepts, when the value in the predetermined field of the received frame does not match the expected value, the value in the predetermined field of the received frame after receiving the same value in the predetermined field the predetermined number of times in succession.

4. A communication method comprising:
transmitting, when a change is made to a value in a predetermined field of a frame, the frame including the predetermined field with the changed value a predetermined number of times in succession;
receiving the frame; and
recognizing the value in the predetermined field of the received frame and conducting acceptance processing for accepting the value in the predetermined field of the received frame,
wherein the acceptance processing includes
comparing, when the value in the predetermined field of the received frame is different from a currently accepted value, the value in the predetermined field of the received frame with an expected value,
accepting the value in the predetermined field of the received frame when the value in the predetermined field of the received frame matches the expected value, and
accepting, when the value in the predetermined field of the received frame does not match the expected value, the value in the predetermined field of the received frame after receiving the same value in the predetermined field the predetermined number of times in succession.

5. The communication method according to claim 4, wherein when a flow path for the frame is switched from a working path to a protection path established between apparatuses, the comparing is implemented in which a value in the predetermined field of a frame received via the protection path is compared with the expected value that is a value in the predetermined field of a frame received via the working path.

6. The communication method according to claim 4, wherein the value in the predetermined field of the frame is frame structure information indicating a structure of the frame, and in the acceptance processing, a subsequently received frame is decoded using the accepted frame structure information.

* * * * *